United States Patent
Cipollini et al.

(10) Patent No.: US 10,593,978 B2
(45) Date of Patent: Mar. 17, 2020

(54) MEA SEAL STRUCTURE CONTAINING CATALYZED LAYER

(75) Inventors: Ned E. Cipollini, Enfield, CT (US); David A. Condit, Avon, CT (US); Sergei F. Burlatsky, Vernon, CT (US); Thomas H. Madden, Glastonbury, CT (US); Wayde R. Schmidt, Pomfret Center, CT (US)

(73) Assignee: AUDI AG, Ingolstadt (DE)

( * ) Notice: Subject to any disclaimer, the term of this patent is extended or adjusted under 35 U.S.C. 154(b) by 1386 days.

(21) Appl. No.: 11/722,862

(22) PCT Filed: Dec. 28, 2004

(86) PCT No.: PCT/US2004/044013
§ 371 (c)(1),
(2), (4) Date: Jun. 26, 2007

(87) PCT Pub. No.: WO2006/071234
PCT Pub. Date: Jul. 6, 2006

(65) Prior Publication Data
US 2008/0096090 A1    Apr. 24, 2008

(51) Int. Cl.
*H01M 8/1004* (2016.01)
*H01M 8/0286* (2016.01)
*H01M 4/92* (2006.01)
*H01M 8/04082* (2016.01)
*H01M 8/0273* (2016.01)

(52) U.S. Cl.
CPC ......... *H01M 8/1004* (2013.01); *H01M 4/926* (2013.01); *H01M 8/0286* (2013.01); *H01M 8/04197* (2016.02); *H01M 8/0273* (2013.01)

(58) Field of Classification Search
None
See application file for complete search history.

(56) References Cited

U.S. PATENT DOCUMENTS

| 5,173,373 A | 12/1992 | Ohsuga |
| 5,464,700 A * | 11/1995 | Steck ................. C25B 9/00 |
| | | 429/483 |
| 5,523,175 A * | 6/1996 | Beal et al. ............... 429/492 |

(Continued)

FOREIGN PATENT DOCUMENTS

| CN | 101032046 A | 9/2007 |
| CN | 101523647 A | 9/2009 |

(Continued)

OTHER PUBLICATIONS

European Search Report dated Apr. 15, 2008 for European Patent Application No. 04815997.4.

(Continued)

*Primary Examiner* — Lucas J. O'Donnell
(74) *Attorney, Agent, or Firm* — Seed Intellectual Property Law Group LLP

(57) ABSTRACT

A membrane electrode assembly includes an anode, a cathode, a membrane disposed between the anode and the cathode, a catalyzed layer in at least one position selected from the group consisting of between the cathode and the membrane and between the anode and the membrane, and an edge seal positioned along an edge of the membrane electrode assembly, wherein the membrane and the catalyzed layer extends into the edge seal.

12 Claims, 1 Drawing Sheet

(56) References Cited

U.S. PATENT DOCUMENTS

| | | | |
|---|---|---|---|
| 5,795,668 A | | 8/1998 | Banerjee |
| 6,020,083 A | * | 2/2000 | Breault et al. ............ 429/492 |
| 6,057,054 A | | 5/2000 | Barton et al. |
| 6,423,439 B1 | * | 7/2002 | Barton et al. ............ 429/509 |
| 6,485,856 B1 | | 11/2002 | Brown et al. |
| 6,613,203 B1 | | 9/2003 | Hobson et al. |
| 6,794,079 B2 | * | 9/2004 | Inagaki et al. ............ 429/492 |
| 2003/0221311 A1 | * | 12/2003 | Smith et al. ............ 29/623.2 |
| 2004/0043283 A1 | * | 3/2004 | Cipollini et al. ............ 429/40 |
| 2004/0191604 A1 | * | 9/2004 | Artibise et al. ............ 429/35 |
| 2004/0224216 A1 | * | 11/2004 | Burlatsky et al. ............ 429/40 |
| 2005/0014056 A1 | | 1/2005 | Zuber et al. |
| 2005/0048349 A1 | * | 3/2005 | Fannon ............ H01M 8/0247 |
| | | | 429/483 |
| 2005/0089746 A1 | * | 4/2005 | James ............ H01M 8/0234 |
| | | | 429/483 |
| 2005/0255372 A1 | | 11/2005 | Lertola |
| 2008/0124458 A1 | | 5/2008 | Okabe |
| 2009/0000732 A1 | | 1/2009 | Jacobine et al. |
| 2009/0148744 A1 | | 6/2009 | Fehervari |
| 2009/0253014 A1 | | 10/2009 | Tanahashi et al. |
| 2009/0258273 A1 | | 10/2009 | Arcella et al. |
| 2009/0286121 A1 | | 11/2009 | Morimoto et al. |
| 2010/0047649 A1 | | 2/2010 | Yamada et al. |
| 2010/0209811 A1 | | 8/2010 | Barnwell et al. |
| 2010/0248087 A1 | | 9/2010 | Tsuji et al. |
| 2014/0011114 A1 | | 1/2014 | Parsons |

FOREIGN PATENT DOCUMENTS

| | | | |
|---|---|---|---|
| EP | 2 048 730 A1 | | 4/2009 |
| JP | 7-501417 A | | 2/1995 |
| JP | 2004-39385 A | | 2/2004 |
| JP | 2004-47230 A | | 2/2004 |
| JP | 2004047230 A | * | 2/2004 |
| JP | 2007-66766 A | | 3/2007 |
| JP | 2008/41337 A | | 2/2008 |
| JP | 2009-252479 A | | 10/2009 |
| KR | 10-0876262 B1 | | 12/2008 |
| KR | 10-2009-0074154 A | | 7/2009 |
| WO | 2004/102721 A2 | | 11/2004 |
| WO | 2008/001755 A1 | | 1/2008 |
| WO | 2009/072291 A1 | | 6/2009 |

OTHER PUBLICATIONS

International Preliminary Report on Patentability, dated Jul. 30, 2013, for International Application No. PCT/US2011/022801, 8 pages.

International Search Report and Written Opinion of the International Searching Authority, dated Oct. 10, 2011, for International Application No. PCT/US2011/022801, 11 pages.

Extended European Search Report, dated Jun. 22, 2016, for European Application No. 11857329.4-1373 / 2668689, 6 pages.

* cited by examiner

MEA SEAL STRUCTURE CONTAINING CATALYZED LAYER

BACKGROUND OF THE INVENTION

The invention relates to fuel cells and, more particularly, to PEM fuel cells and reduction in degradation of the membrane of same.

In a PEM fuel cell, a small amount of oxygen diffuses from the cathode to the anode through the membrane and can form peroxide by reacting with hydrogen at low potential at the anode catalyst surface. This peroxide can dissociate into highly reactive free radicals. These free radicals can rapidly degrade the membrane.

While numerous sources of oxygen, hydrogen and/or peroxide can contribute to this problem, it is oxygen crossing over from the cathode and hydrogen peroxide generated at the cathode which is the focus of the present invention.

It is a primary object of the present invention to minimize degradation caused by such sources of reactive free radicals.

It is a further object of the present invention to provide a membrane electrode assembly having an extended lifetime due to such reduction of oxygen crossover and resulting degradation.

Other objects and advantages of the present invention will appear hereinbelow.

SUMMARY OF THE INVENTION

In accordance with the present invention, the foregoing objects and advantages have been readily attained.

According to the invention, a membrane electrode assembly has been provided which comprises an anode, a cathode, a membrane disposed between the anode and the cathode, catalyzed layers between the cathode and the membrane and/or between the anode and the membrane, and an edge seal positioned along an edge of the membrane electrode assembly, wherein the membrane and the catalyzed layers extend into the edge seal.

The electrodes preferably also extend at least partially into the edge seal.

BRIEF DESCRIPTION OF THE DRAWINGS

A detailed description of preferred embodiments of the present invention follows, with reference to the attached drawings, wherein.

DETAILED DESCRIPTION

The invention relates to fuel cells, especially to PEM fuel cells, and more specifically to reduction of reactant crossover from the electrodes through positioning of an extended or catalyzed layer which consumes residual reactants and thereby avoids production of hydrogen peroxide.

The invention relates further specifically to protection of the membrane in seal regions of a membrane electrode assembly where peroxide-mediated decomposition of the membrane could otherwise occur.

Figure 1:
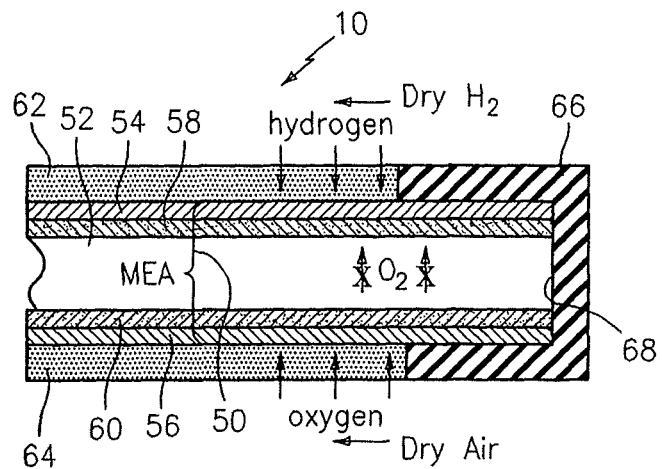
FIG. 1 schematically illustrates the edge region of a UEA including an edge seal and MEA assembly according to the invention.

FIG. 1 shows a unitized electrode assembly (UEA) 10 including a membrane electrode assembly (MEA) 50 having a membrane 52, an anode 54 positioned to one side of membrane 52, a cathode 56 positioned to the other side of membrane 52, and catalyzed layers 58, 60 positioned respectively between membrane 52 and anode 54, and between membrane 52 and cathode 56. As is well known to a person of ordinary skill in the art, gas diffusion layers 62, 64 are positioned outside of electrodes 54, 56 and are used for introduction of hydrogen and oxygen as shown in the drawing.

Also as is well known to a person of ordinary skill in the art, a seal 66 is positioned at an edge 68 of membrane electrode assembly 50 for purposes of sealing UEA 10 to keep reactants separate.

In accordance with the present invention, it has been found that without protection from peroxide-mediated membrane attack, rapid decomposition of membrane 52 within the seal or non-active region can occur.

In accordance with the present invention, this peroxide attack is prevented through extending catalyzed layers 58, 60 to extend along with membrane 52 into edge seal 66. In this way, oxygen and/or hydrogen and any resulting peroxide which diffuses into the edge seal area are consumed by layers 58, 60 so as to prevent decomposition of membrane 52.

In accordance with the embodiment shown in FIG. 1, electrodes 54, 56 are also extended into edge seal 66. This is advantageous from a manufacturing standpoint.

Figure 2:
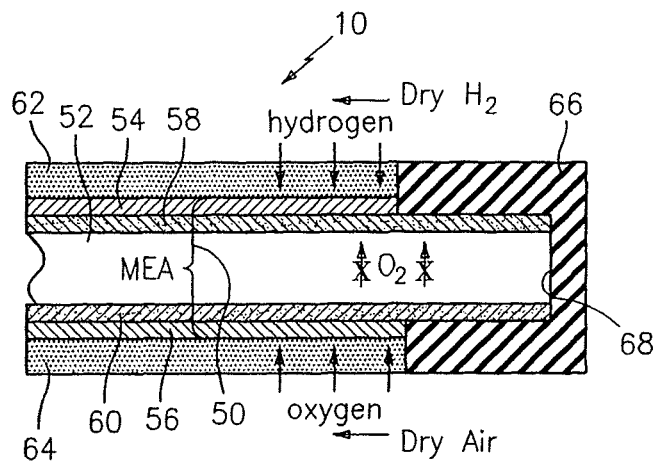
FIG. 2 illustrates an alternative embodiment wherein only the catalyzed layer extends into the edge seal.

FIG. 2 shows an alternative embodiment of the present invention, where like numerals represent like parts. In this embodiment, however, electrodes 54, 56 do not extend into the area of edge seal 66. Thus, edge seal 66 seals directly against catalyzed layers 58, 60. In all other respects, this embodiment functions the same, and catalyzed layers 58, 60 advantageously serve to consume hydrogen and oxygen and/or decompose hydrogen peroxide as described above.

Figure 3:
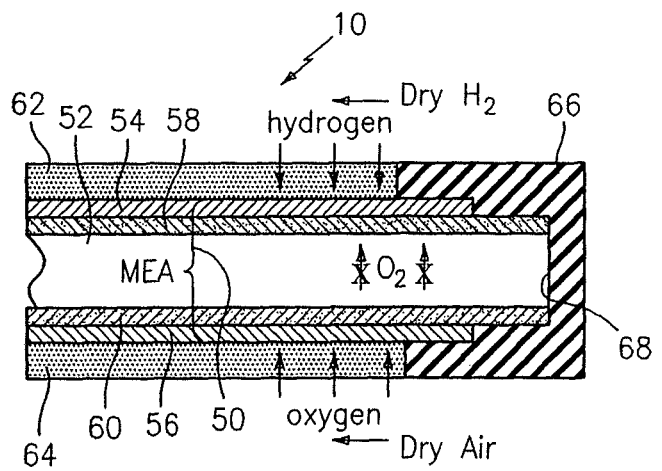
FIG. 3 illustrates a further embodiment wherein the electrodes extend partially into the edge seal.

Turning to FIG. 3, a further alternative embodiment of the present invention is shown. In this embodiment, as with the embodiment of FIG. 2, like reference numerals depict like parts. In this embodiment, electrodes 54, 56 extend into edge seal 66, but not to the same extent as catalyzed layers 58, 60. Thus, in this embodiment, catalyzed layers extend to the edge of membrane 52, while anode 54 and cathode 56 extend into edge seal 66 but terminate prior to reaching the edge of membrane 52 and catalyzed layers 58, 60. In this embodiment, smaller electrodes are used as compared to the embodiment of FIG. 1, and therefore less material is needed.

In accordance with the present invention, any hydrogen, oxygen and peroxide that does diffuse into the seal region is advantageously consumed and/or benignly decomposed by the catalyzed layers, which decomposition is promoted by the electrical connection of the catalyzed layer with the respective electrodes.

FIGS. 1-3 show active and non-active regions of the membrane. The transition between these areas is an "inlet dry out region", and these regions also are important regions for the catalyzed layer to be present. This area, as well, could normally be attacked by peroxide decomposition, but is advantageously protected by catalyzed layers 58, 60 according to the invention.

It should be noted that in the embodiments of FIGS. 1-3, membrane 52, catalyzed layers 58, 60, and any portion of electrodes 54, 56 which extend into edge seal 66, are advantageously hermetically encapsulated within the edge seal. This advantageously provides for a robust configuration of the seal portion of the structure, and, as set forth above, advantageously prevents oxygen crossover to ensure that no peroxide can be generated.

Catalyzed layers 58, 60 can be provided in several forms in accordance with various embodiments of the present invention. In accordance with a preferred embodiment of the present invention the layers 58, 60 comprises a portion of catalyst, for example carbon supported platinum particles, the gas pores of which are filled with polymer electrolyte. Other suitable catalyst includes carbon itself, as well as platinum alloys, preferably platinum cobalt, platinum nickel, platinum iridium, platinum iridium cobalt, platinum chromium cobalt and combinations thereof, and these alloys can be in particle form, and/or may be supported on carbon.

At the relatively high potential which will be present in catalyzed layers 58, 60, the four electron reduction of oxygen is predominately achieved so as to produce water and not produce peroxide.

It should be noted that the subject matter of the present invention can advantageously be utilized in connection with various membranes including but not limited to reinforced membranes. The reinforced membranes can include membranes having mechanical reinforcements, examples of which include but are not limited those disclosed in U.S. Pat. Nos. 5,795,668, 6,485,856 and 6,613,203.

Catalyzed layers 58, 60 can advantageously be provided as porous, electrically connected (that is, in electrical communication or contact with respective electrodes) and ionically conductive structures having a porosity of between about 0% and about 30%. The catalyst can be present in an amount between about 5 and about 50% vol based upon volume of the layer. Ionomer is also present in an amount between about 5 and about 50% vol. based upon volume of the layer.

In each of the embodiments discussed above, a layer or underlayer 58, 60 is positioned between the membrane and one or both electrodes. These underlayers have also been referred to in related filings as an extended catalyzed layer. This layer is distinguishable from the electrode and membrane to which it is generally adjacent in several respects.

One important distinction is porosity. The electrode catalyst layers typically have a porosity of at least about 30%, generally greater than about 35% and typically up to about 60%. In contrast, the layer or underlayer (58, 60 in FIG. 1) preferably has a porosity which is less than that of the electrode catalyst layers, preferably less than about 20%, and more preferably the layer or underlayer is essentially non-porous (porosity <5%).

The electrode catalyst layers also have less ionomer content by volume and by weight than the underlayer.

Electrical connectivity between catalyst particles is another area where the electrode catalyst layer has a greater value, as compared to the underlayers.

In connection with ionic contact of membrane electrolyte to catalyst particles, the electrode catalyst layer is generally lower in value than the underlayer.

Finally, while the electrode catalyst layer is preferably hydrophobic, the underlayer is preferably as hydrophilic as possible so as to retain water to hydrate the ionomer and depress gas diffusion.

It should be noted that there has been provided in accordance with the present invention a solution to the problem of reactant crossover at the edge seal of unitized electrode assemblies, in the form of a catalyzed layer which can be positioned extending into the edge seal as desired. This is particularly advantageous in that crossover reactants are consumed and removed without forming the peroxide which is known to lead to degradation of the membrane.

It is apparent that there has been provided in accordance with the present invention a membrane electrode assembly wherein reactant crossover is minimized. This fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed:

1. A membrane electrode assembly, comprising:
an anode including an anode catalyst layer having an anode catalyst layer porosity;
a cathode including a cathode catalyst layer having a cathode catalyst layer porosity;
a membrane disposed between the anode and the cathode;
a catalyzed layer adjacent to the membrane, the catalyzed layer having a catalyzed layer porosity that is less than the anode catalyst layer porosity and less than the cathode catalyst layer porosity;
a first gas diffusion layer adjacent to the anode;
a second gas diffusion layer adjacent to the cathode; and
an edge seal, the anode, the cathode, the membrane and the catalyzed layer extend into the edge seal, the membrane and the catalyzed layer extend further into the edge seal than the anode and cathode, and the first and second gas diffusion layers do not extend into the edge seal.

2. The assembly of claim 1, wherein the catalyzed layer is a first catalyzed layer and the assembly further comprises a second catalyzed layer positioned between the anode and the membrane, the first catalyzed layer is positioned between the cathode and the membrane, the second catalyzed layer extends further into the edge seal than the anode and the cathode.

3. The assembly of claim 1, wherein the catalyzed layer contains particles selected from the group consisting of particles of carbon, particles of platinum, particles of platinum alloy and combinations thereof.

4. The assembly of claim 3, wherein the particles are supported on carbon.

5. The assembly of claim 3, wherein the particles are platinum alloy selected from the group consisting of platinum cobalt, platinum nickel, platinum iridium, platinum iridium cobalt, platinum chromium cobalt and combinations thereof.

6. The assembly of claim 1, wherein the catalyzed layer is in electrical communication with the anode.

7. The assembly of claim 1, wherein the catalyzed layer is in electrical communication with the cathode.

8. The assembly of claim 1, wherein the catalyzed layer has a porosity of less than about 20%.

9. The assembly of claim 8, wherein the catalyzed layer is substantially non-porous.

10. The assembly of claim 1, wherein the catalyzed layer is positioned between the membrane and the cathode and has an oxygen reduction rate which is substantially the same or greater than an oxygen reduction rate of the cathode.

11. The assembly of claim 1, wherein the catalyzed layer is an electrically connected and ionically conductive structure having a porosity of between about 0% and about 20%, wherein a catalyst is present in the catalyzed layer in an amount between about 5% and about 50% of the volume of the catalyzed layer, and an ionomer is present in the catalyzed layer in an amount between about 30% and about 95% of the volume of the catalyzed layer.

12. The assembly of claim 1, wherein the membrane is a reinforced membrane.

\* \* \* \* \*